United States Patent [19]
Choi

[11] Patent Number: 5,959,955
[45] Date of Patent: Sep. 28, 1999

[54] AUTOMATIC DISK DISCRIMINATING METHOD AND APPARATUS IN OPTICAL DISK SYSTEM

[75] Inventor: Byoung-ho Choi, Suwon, Rep. of Korea

[73] Assignee: Samsung Electronics Co., Ltd., Suwon, Rep. of Korea

[21] Appl. No.: 08/781,533

[22] Filed: Jan. 8, 1997

[30] Foreign Application Priority Data

Jan. 8, 1996 [KR] Rep. of Korea ............................ 96-205

[51] Int. Cl.$^6$ .................................................. G11B 27/36
[52] U.S. Cl. ................................................ 369/58; 369/54
[58] Field of Search ................................ 369/58, 59, 47, 369/48, 54, 44.25, 44.31, 111, 32, 34, 36, 44.26, 110, 50, 27

[56] References Cited

U.S. PATENT DOCUMENTS

| | | | |
|---|---|---|---|
| 5,003,521 | 3/1991 | Yoshida et al. | 369/44.25 |
| 5,042,020 | 8/1991 | Endo | 369/44.31 |
| 5,237,549 | 8/1993 | Shimazawa | 369/44.17 |
| 5,289,451 | 2/1994 | Ashinuma et al. | 369/58 |
| 5,684,771 | 11/1997 | Furakawa | 369/58 |
| 5,745,460 | 4/1998 | Tateishi | 369/58 |

FOREIGN PATENT DOCUMENTS

| | | |
|---|---|---|
| 0 294 490 | 2/1988 | European Pat. Off. . |
| 0 470 807 | 2/1992 | European Pat. Off. . |
| 61-180935 | 8/1986 | Japan . |
| 62-076061 | 4/1987 | Japan . |
| 05054406 | 3/1993 | Japan . |

*Primary Examiner*—Ali Neyzari
*Attorney, Agent, or Firm*—Staas & Halsey

[57] ABSTRACT

An automatic disk discriminating method and apparatus in an optical disk system. A specific period value (that is, a specific frequency) of the information signal reproduced from a disk is compared with a predetermined reference value. If a higher frequency than the predetermined reference value is detected, the disk is determined to be a DVD. If a lower frequency than the predetermined reference value is detected, the disk is determined to be a CD. The disk discriminating method and apparatus are less affected by noise, thereby improving the accuracy in determining the disk type.

20 Claims, 3 Drawing Sheets

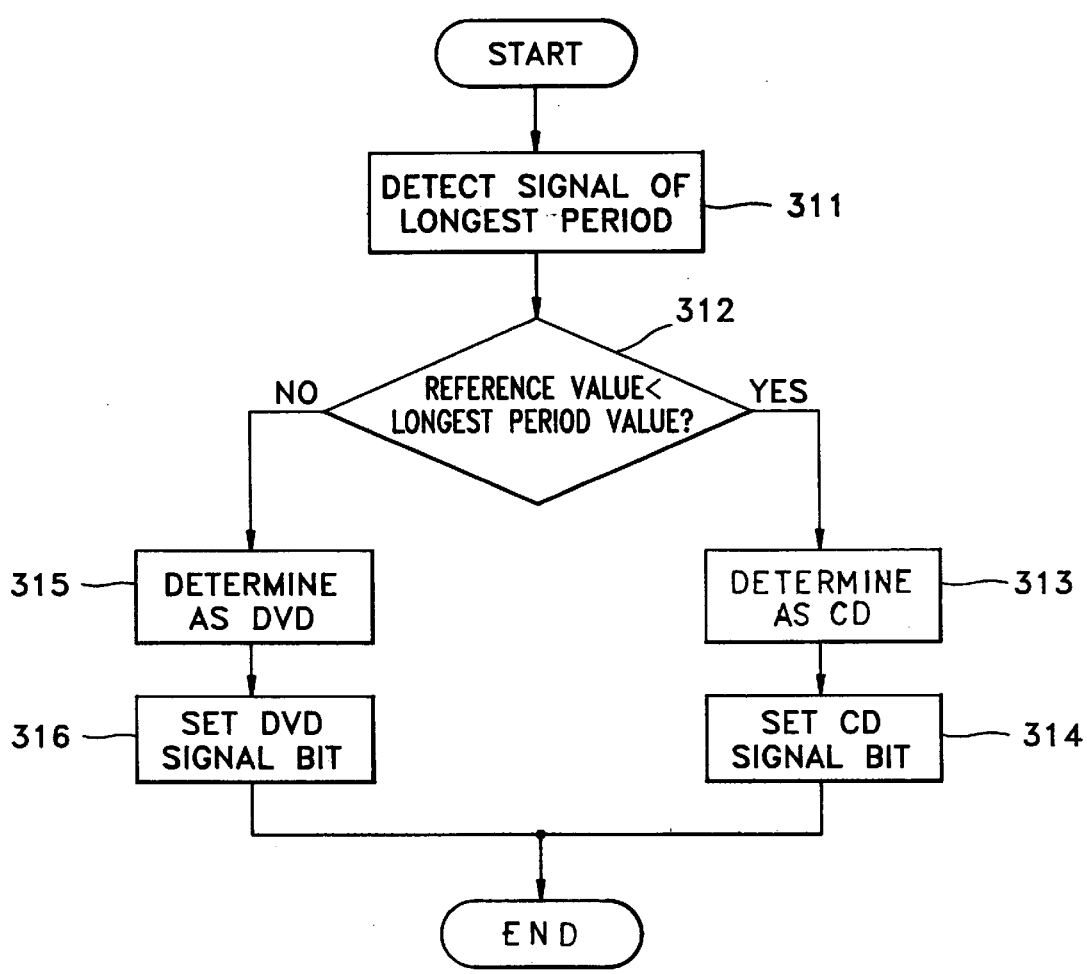

AUTOMATIC DISK DISCRIMINATING METHOD AND APPARATUS IN OPTICAL DISK SYSTEM

BACKGROUND OF THE INVENTION

1. Field of the Invention

The present invention relates to an automatic disk discriminating method and apparatus in an optical disk system, and more particularly, to an automatic disk discriminating method and apparatus for discriminating between disk types by comparing a specific period value of a radio frequency (RF) signal reproduced from each disk with a predetermined reference value, after focus controlling.

Generally, in an optical disk system, when data stored in a disk are read, the focus spot of a laser beam radiated from an optical pickup should land on an exact spot of a disk and travel exactly along a guard groove or data pit so that precise and distortion-free signals are read. In a system of reproducing optical disks having the same physical structure, that is, the same substrate thickness, a reproduction method can be determined by reading out data in a lead-in region of the disk without discriminating between disk types.

However, in the case of a system which can reproduce disks having different physical structures such as a compact disk (CD) or a digital video disk (DVD), a stable servo operation is difficult to achieve and thus the disk types cannot be discriminated. If the disk types are not discriminated, further operations cannot be performed.

2. Description of the Related Art

FIG. 1 shows an optical disk system adopting a conventional disk discriminating apparatus utilizing the amplitude of an information signal to overcome the problem. The disk types can be discriminated by two methods in the disk discriminating apparatus shown in FIG. 1.

In the first disk discriminating method, after performing focusing and tracking control operations corresponding to the CD by a focus driver 116 and a track driver 117, an information signal is detected by a photodiode 112b and a current-to-voltage converter 112c. Subsequently, the amplitude of the information signal is detected by an information signal amplitude detector 113 and compared with a predetermined value by a comparator 114. Based on the compared result, the CPU 120 determines the switching position of the switch 121. Specifically, if the amplitude of the information signal is less than the predetermined value, the comparator outputs a signal (DVD) which signifies that the disk is a DVD. Then, the CPU 120 controls the switching position of the switch 121 such that a DVD loop in the servo signal processor 115 is active, and generates and outputs servo control signals for the DVD. Meanwhile, if the amplitude of the information signal is larger than the predetermined value, the comparator outputs a signal (CD) which signifies that the disk is a CD. Then, the CPU 120 maintains the switching position of the switch 121 such that a CD loop in the servo signal processor 115 is active, and generates and outputs servo control signals for the CD.

On the other hand, in the second method, information for discriminating the thickness of a substrate is extracted by performing focusing and tracking control operations corresponding to the CD. If a central processing unit (CPU) 120 recognizes that the thickness of the substrate corresponds to the DVD by use of the information, the apparatus is switched to a focusing control state for the DVD by the switch 121. In FIG. 1, the reference numerals 118, 119 and 123 indicate a voice coil motor (VCM) driver, a spindle driver and a spindle motor, respectively.

However, according to these methods, the disk type may be erroneously determined if there is noise in the information signal to change the amplitude of the information signal.

SUMMARY OF THE INVENTION

To solve the above-described problems, it is an object of the present invention to provide an automatic disk discriminating method in an optical disk system for discriminating between disk types by comparing a specific period value (that is, a specific frequency) of a radio frequency (RF) signal reproduced from a disk with a predetermined reference value, after focus controlling.

It is another object of the present invention to provide an apparatus suitable for implementing the disk discriminating method in an optical disk system.

To accomplish the above object, there is provided an automatic disk discriminating method in an optical disk system which can compatibly reproduce optical disks of different types, the method comprising the steps of detecting a specific period value of an information signal reproduced from an optical disk when the light from an objective lens is focused on the recording plane of said optical disk, and discriminating a disk type of the optical disk by comparing the detected specific period value with a predetermined reference value.

To accomplish the above second object, there is provided an automatic disk discriminating apparatus in an optical disk system which can compatibly reproduce optical disks of different disk types, the apparatus comprising a digital signal processor for detecting a specific period value of an information signal reproduced from an optical disk when the light from an objective lens is focused on the recording plane of the optical disk and discriminating a disk type by comparing the detected specific period value with a predetermined reference value.

BRIEF DESCRIPTION OF THE DRAWINGS

The above and other objects and advantages of the present invention will become more apparent by describing in detail a preferred embodiment thereof with reference to the attached drawings in which:

FIG. 3 is a flowchart for explaining an automatic disk discriminating method according to the present invention in an optical disk system.

DETAILED DESCRIPTION OF THE INVENTION

Figure 2:
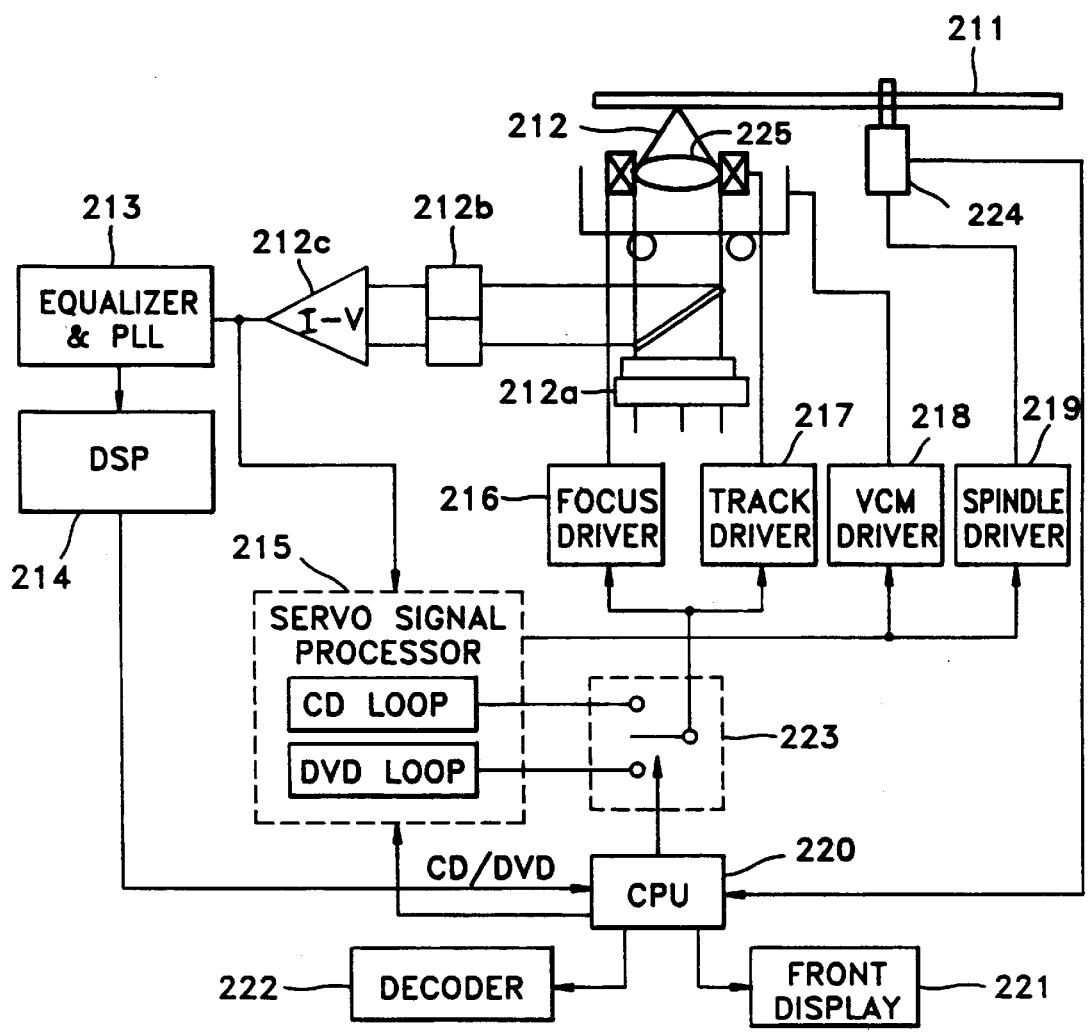
FIG. 2 is a block diagram of an optical disk system adopting an automatic disk discriminating apparatus according to the present invention.

An optical disk system adopting the disk discriminating apparatus according to the present invention, shown in FIG. 2 includes an optical disk 211, an optical pickup 212, a laser diode 212a, a photo diode 212b, a current-to-voltage converter 212c, an equalizer & PLL (phase-locked loop) 213, a digital signal processor (DSP) 214, a servo signal processor 215, a focus driver 216, a track driver 217, a voice coil motor (VCM) driver 218, a spindle driver 219, a CPU 220, a front display 221, a decoder 222, a switch 223 and a spindle motor 224.

Figure 1:
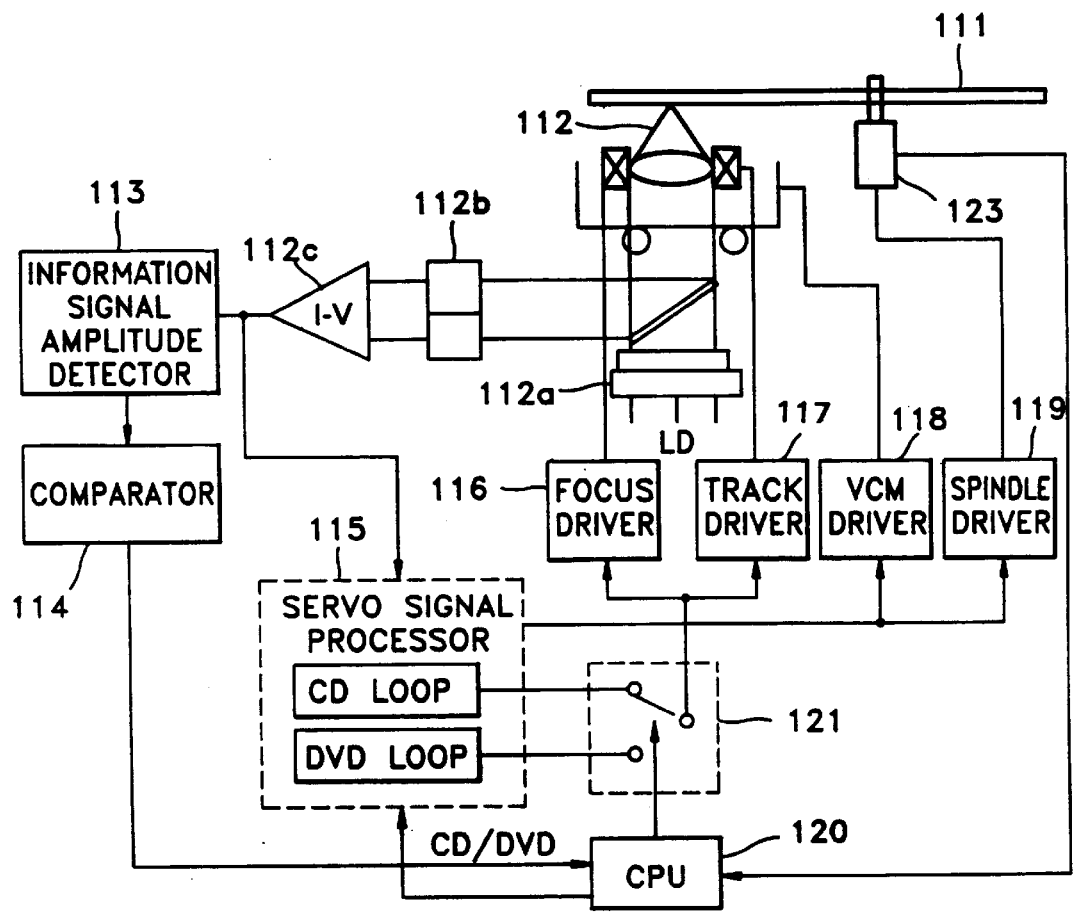
FIG. 1 is a block diagram of an optical disk system adopting a conventional disk discriminating apparatus.

Here, the optical pickup 212 can reproduce information from both CDs and DVDs. The focus driver 216 and track driver 217 are for moving the optical pickup 212. The spindle driver 219 is for rotating the optical disk 211. When compared with the disk discriminating apparatus shown in FIG. 1, the information signal amplitude detector 113 and comparator 114 are replaced with the equalizer & PLL 213 and DSP 214, respectively, and the front display 221 and decoder 222 are further included.

FIG. 3 is a flowchart for explaining an automatic disk discriminating method according to the present invention in an optical disk system, which is executed in the DSP 214 shown in FIG. 2.

The disk discriminating method illustrated in FIG. 3 includes the steps of performing a focus control operation corresponding to an arbitrary substrate thickness with respect to the optical disk rotating at a predetermined speed and detecting a specific period value of an information signal reproduced from the optical disk (step 311), and determining the substrate thickness of the optical disk, that is, the disk type, by comparing the detected specific period value with a predetermined reference value (steps 312 through 316).

The operation and effect of the present invention will now be described, based on the aforementioned configuration.

In the present invention, the differences in the physical structure of optical disks are used.

Generally, pits which store the information signals on the CD and DVD are different from each other in their shortest pit lengths (3T) and longest pit lengths (11T for the CD and 14T for the DVD). Here, T means the period of a main clock used in recording a signal on a disk and are different depending upon the disk thickness. Since the period T for the CD is longer than that for the DVD, the pit on the CD is longer than that on the DVD. Thus, the lengths of the pits are different depending on the disk type. This means that frequencies of an information signal (RF signal) which are reproduced from the disks are different depending on the disk type when the disks rotate at the same velocity.

Referring to FIG. 2, an optical disk 211 is rotated at a constant angular velocity by the spindle driver 219 and a laser beam is focused on the optical disk 211. Then, the information signal stored on the optical disk 211 is read out. The information signal includes various periods. Among them, specific period values such as the longest or shortest period values are used to determine the disk type. For the sake of convenience, the longest period value is taken in this embodiment.

First, a preliminary determination may be performed to enhance the reliability of the discrimination process. To carry out the preliminary determination, the optical disk 211 is seated on a turntable, and is rotated at a constant angular velocity of 8.48 Hz by the spindle motor 224. Then, a laser beam emitted through the objective lens 225 is positioned 23.5 mm from the center of the optical disk 211.

At this time, the switch 223 is positioned such that a CD loop of two loops in the servo signal generator 215 is selected assuming that the optical disk is a CD. Thus, servo control signals which are generated by the CD loop to drive the CD are supplied to the focus driver 216 and the track driver 217.

Subsequently, the objective lens 225 is moved up and down such that the light passing through the objective lens 225 is focused on the disk face. Then, the amplitude of a focus error signal is detected and compared with a predetermined threshold. If the amplitude of the focus error signal is smaller than the predetermined threshold, the optical disk is determined to be a CD. On the other hand, if the amplitude of the focus error signal is larger than the predetermined threshold, the optical disk is determined to be a DVD.

The detection of the focus error signal and the comparison of this signal with the predetermined value is performed twice. If the disk type is not determined by two trials, a third test is performed to determine the disk type in which the disk type indicated twice out of the three tests is determined as the correct disk type. Afterwards, servo control signals are generated according to the result of the preliminary tests.

Then, the main determination is performed which uses the longest period value of the RF signal. Specifically, the digital signal processor 214 detects the longest period value of the RF signal, i.e., the information signal, incoming through the equalizer & PLL 213.

In the case of the CD, the longest pit length (S) is 3.1815 $\mu$m which corresponds to 11T. If the CD rotates at a frequency of 8.48 Hz, the linear velocity (v) will be 1.2525 m/s. Then, the longest period t(11T) can be expressed by the following equation (1):

$$t(11T) = \frac{S}{v} = \frac{3.1818 \ [\mu m]}{1.2525 \ [m/s]} = 2.5454 \ [\mu s] \quad (1)$$

Also, in the case of the DVD, the longest pit length (S) is 1.866 $\mu$m which corresponds to 14T. If the DVD rotates at the same frequency as that of the CD, i.e., 8.48 Hz, the linear velocity (v) is 1.2525 m/s. Then, the longest period t(14T) can be expressed by the following equation (2):

$$t(14T) = \frac{S}{v} = \frac{1.866 \ [\mu m]}{1.2525 \ [m/s]} = 1.49 \ [\mu s] \quad (2)$$

The operation of the digital signal processor 214 will now be described in more detail with reference to FIG. 3.

In the step 311, the longest period value among periods of the RF signal incoming through the equalizer & PLL 213 is detected. In the step 312, the detected longest period value is compared with a predetermined reference value. The reference value is set as an intermediate value of the longest periods of the information signal reproduced from the CD and DVD, respectively.

If the longest period value is greater than the reference value as a result of the comparison in the step 312, the optical disk seated on the turntable is determined to be a CD in the step 313. Subsequently, a CD/DVD discriminating bit applied to the CPU 220 is set to indicate that the disk being reproduced is a CD in the step 314.

If the longest period value is less than the reference value as a result of the comparison in the step 312, the optical disk seated on the turntable is determined to be a DVD in the step 315. Subsequently, the CD/DVD discriminating bit applied to the CPU 220 is set to indicate that the disk being reproduced is a DVD in the step 316.

Afterwards, the CPU 220 outputs a switching signal to the servo signal processor 215, decoder 222 and front display 221 so that a servo gain control is carried out according to the disk type.

In another embodiment of the present invention, the disk type is determined by detecting the shortest period value of the RF signal (information signal) detected from the equalizer & PLL 213. At this time, an intermediate value of the respective shortest period values of the information signal reproduced from the CD and the DVD is used as a predetermined reference value.

As described above, in an automatic disk discriminating method and apparatus in an optical disk system according to the present invention, the longest period (that is, the shortest frequency) or the shortest period (that is, the longest frequency) of the signal reproduced from each disk having different thicknesses is compared with a predetermined reference value, respectively. If a higher frequency than the predetermined reference value is detected, the disk is determined to be a DVD. If a lower frequency than the predetermined reference value is detected, the disk is determined to be a CD. Therefore, compared to the conventional method for discriminating between disk types using the amplitude of an information signal, the present invention is less affected by noise, thereby improving the accuracy in determining the disk type.

What is claimed is:

1. An automatic disk discriminating method in an optical disk system which compatibly reproduces data from optical disks of different types, said method comprising the steps of:

detecting a specific period value of an information signal reproduced from one of the optical disks when the light from an objective lens is focused on the recording plane of the one optical disk; and discriminating a disk type of the one optical disk by comparing the detected specific period value with a predetermined reference value.

2. An automatic disk discriminating method in an optical disk system as claimed in claim 1, wherein the disk types are a compact disk and a digital video disk.

3. An automatic disk discriminating method in an optical disk system as claimed in claims 1, wherein the specific period value is a longest period value of the information signal.

4. An automatic disk discriminating method in an optical disk system as claimed in claim 2, wherein the reference value is set as an intermediate value of the respective longest periods of the information signal reproduced from the one disk if the one disk is the compact disk and the one disk if the one disk is the digital video disk.

5. An automatic disk discriminating method in an optical disk system as claimed in claim 3, wherein the longest period value is approximately 2.54 $\mu$sec if the one disk is the compact disk and 1.49 $\mu$sec if the one disk is the digital video disk.

6. An automatic disk discriminating method in an optical disk system as claimed in claim 1, wherein the specific period value is a shortest period value of the information signal.

7. An automatic disk discriminating method in an optical disk system as claimed in claim 2, wherein the reference value is set as an intermediate value of the respective shortest periods of the information signal reproduced from the one disk if the one disk is the compact disk and the one disk if the one disk is the digital video disk.

8. An automatic disk discriminating method in an optical disk system as claimed in claim 1, further comprising the steps of:

rotating the one optical disk at a constant angular velocity and switching the optical disk system to a first loop mode;

moving the objective lens back and forth in a direction perpendicular to a surface of the one disk to determine an amplitude of a focus error signal;

comparing the amplitude of the focus error signal with a predetermined threshold to prediscriminate the disk type of the one optical disk.

9. An automatic disk discriminating method in an optical disk system as claimed in claim 8, further comprising the step of generating servo control signals based upon the prediscriminated disk type of the one optical disk.

10. An automatic disk discriminating method in an optical disk system as claimed in claim 8, further comprising reperforming the steps of moving the objective lens and comparing the amplitude of the focus error signal, and using the two comparison results to prediscriminate the disk type of the one optical disk.

11. An automatic disk discriminating apparatus in an optical disk system which compatibly reproduces data from optical disks of different disk types, said apparatus comprising:

an objective lens to focus light on a recording plane of one of the optical disks; and a digital signal processor for detecting a specific period value of an information signal reproduced from the one of the optical disks when the light from said objective lens is focused on the recording plane of the one optical disk and discriminating a disk type of the one optical disk by comparing the detected specific period value with a predetermined reference value.

12. An automatic disk discriminating apparatus in an optical disk system as claimed in claim 11, wherein the disk types are a compact disk and a digital video disk.

13. An automatic disk discriminating apparatus in an optical disk system as claimed in claims 11, wherein the specific period value is a longest period value of the information signal.

14. An automatic disk discriminating apparatus in an optical disk system as claimed in claim 12, wherein the reference value is set as an intermediate value of the respective longest periods of the information signal reproduced from the one disk if the one disk is the compact disk and the one disk if the one disk is the digital video disk.

15. An automatic disk discriminating apparatus in an optical disk system as claimed in claim 11, wherein the specific period value is a shortest period value of the information signal.

16. An automatic disk discriminating apparatus in an optical disk system as claimed in claim 12, wherein the reference value is set as an intermediate value of the respective shortest periods of the information signal reproduced from the one disk if the one disk is the compact disk and the one disk if the one disk is the digital video disk.

17. An automatic disk discriminating apparatus in an optical disk system as claimed in claim 11, further comprising an equalizer and phase-locked loop circuit to receive and process the information signal from said objective lens and to output the processed information signal to said digital signal processor.

18. An automatic disk discriminating apparatus in an optical disk system as claimed in claim 13, wherein the longest period value is approximately 2.54 $\mu$sec if the one disk is the compact disk and 1.49 $\mu$sec if the one disk is the digital video disk.

19. An automatic disk discriminating apparatus in an optical disk system as claimed in claim 11, further comprising:

a central processing unit to receive a switching signal dependent upon the disk type of the one disk;

a servo signal processor to receive the switching signal; and a decoder to receive the switching signal;

wherein said servo signal processor and said decoder perform servo gain control based upon the switching signal.

20. An automatic disk discriminating apparatus in an optical disk system as claimed in claim 11, further comprising:

a driver to rotate the one optical disk at a constant angular velocity and switching the optical disk system to a first loop mode, moving said objective lens back and forth in a direction perpendicular to a surface of the one disk to determine an amplitude of a focus error signal;

wherein said digital signal processor compares the focus error signal with a predetermined threshold to prediscriminate the disk type of the one optical disk.

* * * * *